United States Patent [19]

Hibino et al.

[11] 3,849,139

[45] Nov. 19, 1974

[54] POLYETHYLENE TEREPHTHALATE FILM FOR USE AS ROENTGENOGRAPHIC FILM BASE

[75] Inventors: Noburo Hibino; Kunihira Seto; Teruo Kobayashi; Kazuo Inoue, all of Kanagawa, Japan

[73] Assignee: Fuji Photo Film Co., Ltd., Kanagawa, Japan

[22] Filed: Sept. 7, 1972

[21] Appl. No.: 287,209

[30] Foreign Application Priority Data

Sept. 9, 1971 Japan.............................. 46-69853

[52] U.S. Cl................. 96/84 R, 96/87 R, 250/472, 260/40 R
[51] Int. Cl............................................. G03c 1/84
[58] Field of Search............ 96/87 R, 84 R; 250/472

[56] References Cited
UNITED STATES PATENTS 3,458,537  7/1969  Johnson............................. 260/380
3,488,195  1/1970  Hunter................................ 96/84 R

*Primary Examiner*—Ronald H. Smith
*Attorney, Agent, or Firm*—Sughrue, Rothwell, Mion, Zinn & MacPeak

[57] ABSTRACT

A roentgenographic base film comprising a film of polyethylene terephthalate and, incorporated therein, (a) at least one of 1-(p-benzyloxyanilino)-4-hydroxyanthraquinone and 1-(p-phenethyloxyanilino)-4-hydroxyanthraquinone and (b) another anthraquinone derivative capable of giving a blue or bluish purple color. A roentgenographic film produced by coating a silver halide emulsion on this base film gives an image that is easy to see, without adversely affecting its photographic properties such as sensitivity, gamma or fog.

3 Claims, No Drawings

POLYETHYLENE TEREPHTHALATE FILM FOR USE AS ROENTGENOGRAPHIC FILM BASE

BACKGROUND OF THE INVENTION

1. Field of the Invention

This invention relates to a polyethylene terephthalate film for use as a photographic film base, and more specifically to a blue or bluish purple tinted polyethylene terephthalate film for use as a roentgenographic film base.

2. Description of the Prior Art

In roentgenographic films, the base films should desirably be colored blue or bluish purple in order to facilitate the perception of photographic images. Furthermore, it is desirable that roentgenogrpahic films have a reduced absorption of light in the short wavelength region. This is to obviate the defects of the material, such as roentgenographic films, in which a photographic emulsion is coated on one or both surfaces of the film base in that desensitization of a filter occurs at the time of photographing and there is obtained a photographic image having yellow fog, which makes it difficult to perceive the image.

Accordingly, dyes for coloring a polyethylene terephthalate film used as a base of a roentgenographic film must simultaneously meet the requirements of heat resistance, sublimation resistance, compatibility and suitable color. They should also be inert to silver halide emulsions, and should not adversely affect the photographic properties of the film such as sensitivity, gamma or fog.

Commercially, a film of polyethylene terephthalate is produced by the melt-extrusion method, and therefore, a coloring agent for the film is required to have thermal stability at temperatures as high as 270°C. to 320°C. Since the polyethylene terephthalate film has a very stable physical structure, it is not easy to color it using methods such as dyeing. Accordingly, a suitable coloring method is to incorporate the coloring agent during the synthesis of the polymer or its melt-shaping, and disperse or dissolve it in the polyethylene terephthalate. A coloring dye should therefore withstand the shaping temperatures of 270°C. to 320°C., and have a high degree of thermal stability which obviates problems due to thermal decomposition or discoloration. This coloring method has the advantage that coloration can be effected simultaneously with shaping, and no separate coloration step is necessary.

The polyethylene terephthalate film is produced by first drying chips of polyethylene terephthalate, heating and melt-extruding the polyethylene terephthalate chips, stretching and heat-treating the film to form a final product. Drying of the polyethylene terephthalate chips should preferably be performed at 135°C. to 210°C. at reduced pressure, as is described in Japanese Patent Publication No. 618/53. If the chips are not dried, polyethylene terephthalate undergoes hydrolysis during heat melting, and either a film cannot be produced, or only those films which have extremely inferior properties such as low strength can be obtained.

On the other hand, polyethylene terephthalate films are usually produced using the tenter method, the loss of edges (the portions of the film which are held by tenter clips) cannot be avoided. These edges are recovered and pulverized, and dried together with virgin chips. When the polyethylene terephthalate chips are colored using a dye having poor resistance to sublimation, the dye sublimes from the recovered edges during the drying process.

Therefore, not only is there a loss of the dye, but also the dye contaminates the dryer used or the dyes fall off irregularly, resulting in a variation in the dye density. Furthermore, when polyethylene terephthalate containing a dye which readily sublimes is extruded from a die onto a casting drum, and cooled, the dye sublimes and contaminates the casting drum, and the colored film itself suffers from density unevenness. It is evident therefore that the polyethylene terephthalate film should be colored using a dye having good resistance to sublimation.

In the above-described coloring process, it is necessary, above all, to have a coloring dye which can be readily and uniformly dispersed or dissolved in polyethylene terephthalate. Especially when it is used as a photographic film base, the haze of the base or the presence of granular foreign matter thereon because of an insufficient dispersion of the coloring dye should be avoided by all means, since the surface of the film support is required to have a high degree of transparency and be completely free from optical imperfections. As is well known, in order to obtain useful properties, an amorphous unoriented film of polyethylene terephthalate needs to be stretched and heat-treated under suitable temperature conditions. Therefore, even if the coloring agent is dispersed uniformly in the amorphous unoriented film to an extent which apparently does not harm its transparency, frequently voids are formed in the subsequent stretching step between the very fine dispersed particles of the coloring agent which cannot be plastically deformed and the polyethylene terephthalate matrix which is capable of a large plastic deformation, and these voids scatter light to cause an increase in the hazes of the film. Accordingly, in the production of photographic film bases, sufficient consideration should be given so as to disperse the coloring agent in the form of very fine particles or dissolve the agent in the form of a molecular dispersion.

SUMMARY OF THE INVENTION

It is an object of this invention to provide a coloring agent for a polyethylene terephthalate film for use in a roentgenographic film, which simultaneously meets the very stringent requirements with respect to photographic properties, thermal resistance, compatibility and color.

Dyes having various structures have been investigated, and it has been found that 1-(p-benzyloxyanilino)-4-hydroxy-anthraquinone and 1-(p-phenethyloxyanilino)-4-hydroxyanthraquinone are suitable as coloring agents that satisfy the above-described requirements, and the invention comprises a roentgenographic film base of polyethylene terephthalate, at least one of these two dyes and another anthraquinone derivative capable of giving a blue or a bluish purple color.

DETAILED DESCRIPTION OF THE INVENTION

The polyethylene terephthalate, as used in the present invention, includes not only those composed of ethylene terephthalate units alone, but also those containing units derived from a third component. Examples of suitable third components are isophthalic acid, phthalic acid, adipic acid, succinic acid, azelaic acid, sebacic acid, diethylene glycol, triethylene glycol, propylene glycol, cyclohexane dimethanol, or dihydroxy alcohols having the formula HO-(CH₂)ₙ-OH (n being an integer of 3 to 8).

The 1-(p-benzyloxyanilino)-4-hydroxyanthraquinone and the 1-(p-phenethyloxyanilino)-4-hydroxyanthraquinone dyes can be prepared, for example, by condensing leuco-quinizarin with an aniline derivative using the known methods disclosed in Japanese Patent Publication No. 3237/69 and U.S. Pat. No. 3,458,537 (corresponding to British Pat. No. 1,170,494). These days simultaneously meet the above-described requirements of photographic properties, thermal resistance and compatibility. With respect to the photographic properties, these dyes are photographically inert to silver halide roentgenographic emulsions, and do not adversely affect the sensitivity, gamma and fog.

These dyes can be used either alone or as a mixture of the dyes, and are employed as a mixture with an anthraquinone dye derivative of the following formula described in U.S. Pat. application Ser. No. 851,853/69, now abandoned, and U.S. Pat. C.I.P. application Ser. No. 252,061/72, now abandoned, which can give a blue or bluish purple color.

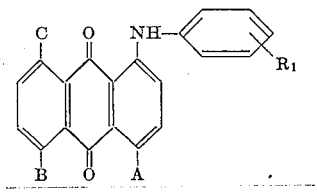

wherein A, B and C each is a hydrogen atom, a hydroxyl group or a

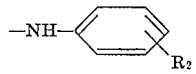

group with the proviso that A, B and C are not simultaneously hydrogen atoms, and when A is

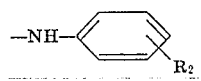

or a hydroxyl group, B and C are not simultaneously hydrogen atoms; $R_1$ and $R_2$ each is a hydrogen atom, a halogen atom, and alkyl group having from 1 to 4 carbon atoms or an alkoxy group having from 1 to 4 carbon atoms, with the proviso that the alkyl groups represented by $R_1$ and $R_2$ are not substituted at the para- or meta-position with respect to the anilino group.

Examples of suitable compounds having the above described general formula are 1,8-di(p-methoxyphenylamino)anthraquinone, 1,8-di(o-methoxyphenylamino)anthraquinone, 1,8-di(o-methylphenylamino)anthraquinone, 1,8-diphenylaminoanthraquinone, 1,5-di(o-methoxyphenylamino)anthraquinone, 1,5-di(p-methoxyphenylamino)-anthraquinone, 1,5-di(p-chlorophenylamino)anthraquinone, 1,5-di(o-methylphenylamino)anthraquinone, 1,5-di(p-methoxyphenylamino)-4,8-dihydroxyanthraquinone, 1,5-di(o-methylphenylamino)-4,8-dihydroxyanthraquinone, 1,5-diphenylamino-4,8-dihydroxyanthraquinone, 1,5-di(o-methoxyphenylamino)-dihydroxyanthraquinone, 1,8-diphenylamino-4,8-dihydroxyanthraquinone, 1-phenylamino-4,5,8-trihydroxyanthraquinone, 1,4,5,8-tetraphenylamino-anthraquinone, 1,5-di(m,p-dichlorophenylamino)anthraquinone, 1-phenylamino-4-(o-methoxyphenylamino)- 5,8-dihydroxyanthraquinone and 1-phenylamino-4-(p-chlorophenylamino)-5,8-dihydroxyanthraquinone.

The preferred amount of the dye capable of giving a blue or bluish purple color to be mixed with the 1-(p-benzyloxyanilino)-4-hydroxyanthraquinone or 1-(p-phenethyloxyanilino)-4-hydroxyanthraquinone is from 30 to 70% by weight based on the amount of the 1-(p-benzyloxyanilino)-4-hydroxyanthraquinone and the 1-(p-phenethyloxyanilino)-4-hydroxyanthraquinone present. When these two dyes are used as a mixture of each other, they can be mixed with the dye of the above general formula in a proportion of 30 to 70% by weight. The amount of the dye which is present in the polyethylene terephthalate can range from 50 ppm to 700 ppm, preferably from 100 ppm to 500 ppm.

When the masscolored polyester film of the present invention by melt film-forming method is applied to the roentgenographic photography, the surface of the film is first subjected to the activating treatment using, for example, an ultraviolet radiation, a corona discharge, a chromic acid treatment, an air-propane flame treatment which are well known in the art, and the thus treated film is then provided with a subbing layer as disclosed in U.S. Pat. No. 3,337,364; British Pat. No. 1,014,344 (Priority: Belgian Patent application Ser. No. 604,149, 61,6,12 by Gevaert Photo-Producten N.V.) U.S. Pat. No. 3,615,557 etc. The film is finally coated with a roentgenographic light-sensitive silver halide photographic emulsion on the subbing layer using the conventional procedure as disclosed in, for example, U.S. Pat. No. 3,650,759 to obtain the roentgenographic photographic film. The silver halide referred to above is generally silver bromoiodide, and a suitable roentgenographic light-sensitive photographic emulsion usually contains the silver bromoiodide in an amount of from about 120 g to about 130 g per 1,000 g of the emulsion, with the proportion of Br:I of from 97:3 to 99:1. The emulsion may also contain such additives as sensitizing agents, anti-foggants, hardening agents, coating aids, stabilizers, plasticizers, etc.

The following examples will specifically illustrate the present invention in greater detail. In the examples all parts, percentages, and ratios are by weight unless otherwise specified.

Example 1

One part of a coloring dye consisting of 1-(p-benzyloxyanilino)-4-hydroxyanthraquinone and 1,5-(o-methylanilino)-4,8-hydroxyanthraquinone in a ratio of 47:53 was mixed with 99 parts of polyethylene terephthalate chips using the dry blending method. The mixture was kneaded and melt-extruded using an extruder to form a master batch having a total dye content of 1%. The master batch was mixed with uncolored polyethylene terephthalate chips so that the total dye content of the resulting film would be 0.022 %, and the mixture was subjected to a conventional melt film-forming method as disclosed in U.S. Pat. No. 2,779,684. The film obtained was bluish purple, and was found to be free from any reduction in transparency, any clouding, or any defects ascribable to scattered particles. Furthermore, the coloring agent used did not contaminate a casting drum used in film-formation to a great extent.

Both surfaces of the film were then radiated by ultraviolet ray from a 1 kw quartz mercury lamp in air at a temperature of 80°C for 1 minute as disclosed in U.S. Pat. No. 3,475,193 and immediately thereafter were coated with a gelatin-organic solvent dispersion having the following composition followed by being dried at a temperature of 120°C for 2 minutes:

Composition of Gelatin-Organic Solvent Dispersion (Part by Weight)

| | |
|---|---|
| Gelatin | 1 Part |
| Acetic Acid | 1 Part |
| Methanol | 20 Parts |
| Acetone | 60 Parts |
| Methylene Chloride | 10 Parts |
| Tetrachloroethane | 5 Parts |
| Phenol | 5 Parts |

Both surfaces of the resulting masscolored polyester film support were then coated with a high-speed roentgenographic light-sensitive silver bromoiodide photographic emulsion (AgI, 1.5 mol%; gelatin, 1509/mol AgX), sensitized with sulfur and gold, containing an appropriate amount of chrome alum and saponin to provide a coating containing 55 mg of Ag per 100 cm$^2$ of one surface on the subbing layer. The thus obtained element was then dried to give a medical roentgenographic film.

The medical roentgenographic photographic film was then exposed to X-ray for 0.5 second using Phantom (manufactured by Alderson Research Laboratories Inc.,) as a test object and Kyokko-FS (containing CaWO$_4$, manufactured by Dai Nippon Toryo Co., Ltd.) as a fluorescent intensifying screen at a distance of 80 cm between the X-ray source and the Phantom test object under the conditions set forth in Table 1 below to prepare a roentgenographic image film.

Table 1

| Sample No. | Phantom | A.C.Current (mA) | Volt (KV) |
|---|---|---|---|
| I | Head | 100 | 80 |
| II | Trunk (Breast) | 100 | 60 |
| III | Trunk (Waist) | 100 | 80 |
| IV | Foot | 100 | 40 – 50 |

Each of the exposed medical roentgenographic photographic films (Sample Nos. I, II, III and IV) was then treated with a developing solution having the following composition for 4 minutes at a temperature of 20°C.

Composition of Developing Solution

| | |
|---|---|
| Metol (N-methyl-p-aminophenol sulfite) | 4.0 g |
| Sodium Sulfite Anhydrous | 60.0 g |
| Hydroquinone | 10.0 g |
| Sodium Carbonate Anhydride | 53.0 g |
| Potassium Bromide | 2.5 g |

The developed image on the film was easy to see, and its photographic characteristics such as sensitivity, gamma or fog were not affected at all.

The tensile strength, elongation on breaking and tear propagation resistance (this value obtained using an Elmendorf tester) of the colored film were measured, and the results obtained are shown in Table 2 below. It was found that these properties were the same as those of an uncolored film produced under the same conditions.

Table 2

| | Tensile Strength (Kg/mm$^2$) | Elongation at Breaking (%) | Tear Propagation Resistance (g) |
|---|---|---|---|
| Colored Film | 23 – 24 | 110 – 120 | 110 – 130 |
| Uncolored Film | 23 – 24 | 110 – 120 | 110 – 130 |

When the above procedure was repeated using 1-anilino-4-hydroxyanthraquinone instead of the 1-(p-benzyloxyanilino)-4-hydroxy-anthraquinone, the casting drum was contaminated due to sublimation of the dyes during the film-forming operation.

In order to determine this sublimation, 2 g of a dye was placed in the bottom of a test tube with an inner diameter of 18 cm, and 10 g of uncolored chips of polyethylene terephthalate were also placed in it (the height of the chips in the test tube was about 5.5 cm). This test tube was maintained vertically and in a vaccum (about 0.1 mm Hg), immersed in a silicone oil bath at 180°C, and further maintained therein for 4 hours. In the case of 1-(p-benzyloxyanilino)-4-hydroxyanthraquinone and 1-(p-phenethyloxyanilino)-4-hydroxyanthraquinone, only those chips which were at the bottom of the test tube were colored, and those chips present above about 8 mm from the bottom were not colored. When the dye was 1-anilino-4-hydroxyanthraquinone having poor resistance to sublimation, all of the chips packed in the test tube were colored.

Example 2

In the same manner as set forth in Example 1, a 50:50 mixture of 1-(p-phenethyloxyanilino)-4-hydroxyanthraquinone and 1-anilino-4,5,8-trihydroxyanthraquinone was mixed with polyethylene terephthalate chips so that the total dye content of the resulting film would be 0.02%. The film obtained was 0.180 mm thick. The film was bluish purple, and found to be free from any reduction in transparency, any clouding, or any defects ascribable to scattered particles. The film thus obtained was then subjected to the same treatment as used in Example 1.

The film was coated with a silver halide roentgenographic emulsion, and subjected to roentgenogram. The developed image was easy to see, and its photographic characteristics such as sensitivity, gamma or fog were not affected at all.

Example 3

The procedure of Example 1 was repeated except that each of 1-(p-benzyloxyanilino)-4-hydroxyanthraquinone or 1-(p-phenethyloxyanilino)-4-hydroxyanthraquinone was used in an amount such that the film obtained had a dye content of 0.02%. The film obtained was slightly bluish purple, and as in Example 1 its photographic characteristics were not affected adversely.

While the invention has been described in detail and with reference to specific embodiments thereof, it will be apparent to one skilled in the art that various changes and modifications can be made therein without departing from the spirit and scope thereof.

What is claimed is:

1. A roentgenographic photographic element comprising a base film comprising a film of polyethylene terephthalate and, incorporated therein, (a) at least one of 1-(p-benzyloxyanilino)-4-hydroxyanthraquinone or 1-(p-phenethyloxyanilino)-4-hydroxyanthraquinone, and (b) an anthraquinone derivative of the general formula

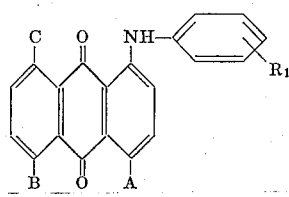

wherein A, B and C each is a hydrogen atom, a hydroxyl group or a

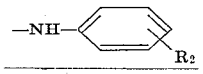

group with the proviso that A, B and C are not simultaneously hydrogen atoms, and when A is a

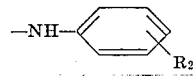

group or a hydroxyl group, B and C are not simultaneously hydrogen atoms; $R_1$ and $R_2$ are a hydrogen atom, a halogen atom, an ortho-substituted alkyl group or an alkoxy group, said base film having coated thereon an X-ray sensitive silver halide photographic emulsion.

2. The element of claim 1, wherein the proportion of said anthraquinone derivative of the general formula ranges from 30 to 70% by weight based on the total weight of said 1-(p-benzyloxyanilino)-4-hydroxyanthraquinone and said 1-(p-phenethyloxyanilino)-4-hydroxyanthraquinone.

3. The element of claim 1, wherein said anthraquinone derivative of the general formula is selected from the group consisting of 1,8-di(p-methoxyphenylamino)anthraquinone, 1,8-di(o-methoxyphenylamino)anthraquinone, 1,8-di-(o-methylphenylamino)anthraquinone, 1,8-diphenylaminoanthraquinone, 1,5-di(o-methoxyphenylamino)anthraquinone, 1,5-di-(p-methoxyphenylamino)anthraquinone, 1,5-di(p-chlorphenylamino)anthraquinone, 1,5-di(o-methylphenylamino)anthraquinone, 1,5-di(p-methoxyphenylamino)-4,8-dihydroxyanthraquinone, 1,5-di(o-methylphenylamino)-4,8-dihydroxyanthraquinone, 1,5-diphenylamino-4,8-dihydroxyanthraquinone, 1,5-di(o-methoxyphenylamino)-dihydroxyanthraquinone, 1,8-diphenylamino-4,8-dihydroxyanthraquinone, 1-phenylamino-4,5,8-trihydroxyanthraquinone, 1,4,5,8-tetraphenylaminoanthraquinone, 1,5-di-(m,p-dichlorophenylamino)anthraquinone, 1-phenylamino-4-(o-methoxyphenylamino)-5,8-dihydroxyanthraquinone and 1-phenylamino-4-(p-chlorophenylamino)-5,8-dihydroxyanthraquinone.

* * * * *